May 25, 1937.  J. P. KANE  2,081,203

DRESSING TABLE WITH ROTATABLE MIRRORS

Filed March 19, 1935  2 Sheets-Sheet 1

INVENTOR.
JOHN P. KANE.
BY
ATTORNEY.

May 25, 1937. J. P. KANE 2,081,203
DRESSING TABLE WITH ROTATABLE MIRRORS
Filed March 19, 1935 2 Sheets-Sheet 2

INVENTOR.
JOHN P. KANE
BY
ATTORNEY.

Patented May 25, 1937

2,081,203

UNITED STATES PATENT OFFICE 2,081,203

DRESSING TABLE WITH ROTATABLE MIRRORS

John P. Kane, New York, N. Y.

Application March 19, 1935, Serial No. 11,803

3 Claims. (Cl. 88—88)

The present invention relates to dressing tables carrying a rotatable multi-part mirror.

It is an object of the invention to provide a dressing table with a plurality of mirrors carried by a rotatable carrier and with a shield.

A further object of the invention is to provide a dressing table having a rotatable member carrying a night and a day mirror mounted thereon and a shield to co-operate with the aforesaid mirrors.

It is also within the contemplation of the invention to provide a dressing table having a rotatable member mounted on the rear thereof and divided into three sectors, one of which contains an ordinary mirror, the second a night mirror, and the third a day mirror.

The invention likewise contemplates the provision of a novel combination which enables a woman to sit at a dressing table and to put on her make up and to determine exactly her appearance under daylight conditions or night light conditions.

Other objects and advantages of the invention will become apparent from the following description taken in conjunction with the accompanying drawings, in which:—

Figure 1:
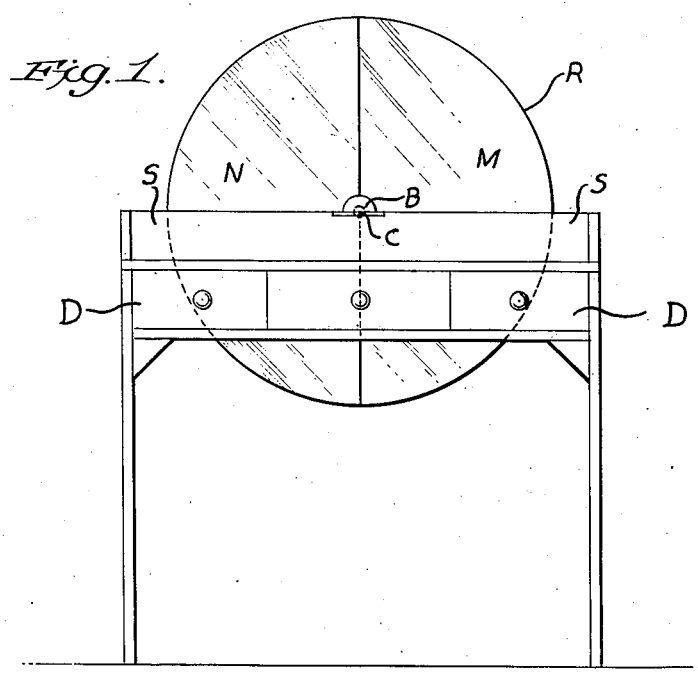
Fig. 1 illustrates a front elevational view of a dressing table embodying my invention.
Figure 2:
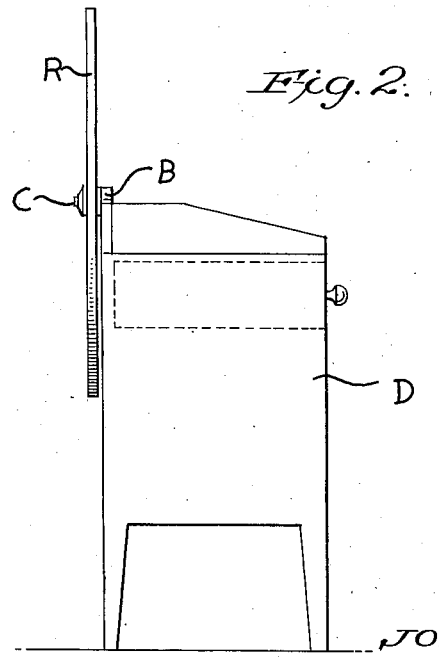
Fig. 2 is a side elevation of Fig. 1.

Referring more particularly to Fig. 1, the reference character D designates a dressing table. At the rear of the table, a rotatable member R is mounted in any appropriate manner. In the present instance, the rotatable member is provided with a central shaft C which is carried in a bearing B. With this construction, the rotatable member may be turned or rotated about its central shaft.

On the front face of the rotatable member, a plurality of mirrors are mounted in special relation to each other and the dressing table. In the embodiment illustrated, the individual mirrors have a semi-circular shape. One mirror is a day mirror and is designated by the reference character M. In other words, the person looking into this special mirror may see what she will look like in the daylight. The second mirror is a night mirror N, in which a woman may see what her appearance will be in the night or artificial light. In either instance, a woman may put on her make up, such as rouge, powder, lip stick and the like, and then look into the day mirror or the night mirror in order to see her appearance in daylight or artificial light.

Co-operating with the mirrors is a shield S which is positioned at the top of the dressing table. It is preferred to make the shield an integral part of the top of the dressing table. It is to be noted that the shield is so shaped and positioned on the table that only approximately one half of the rotatable member or one individual mirror is exposed and is visible to a person seated opposite to the dressing table, while the view of the other half is obstructed by means of the shield and of the table. Thus, the person using the table can turn the rotatable member to obstruct the view of one mirror and to expose the other. The person can use either the day mirror or the night mirror according to the requirements of the situation.

Figure 3:
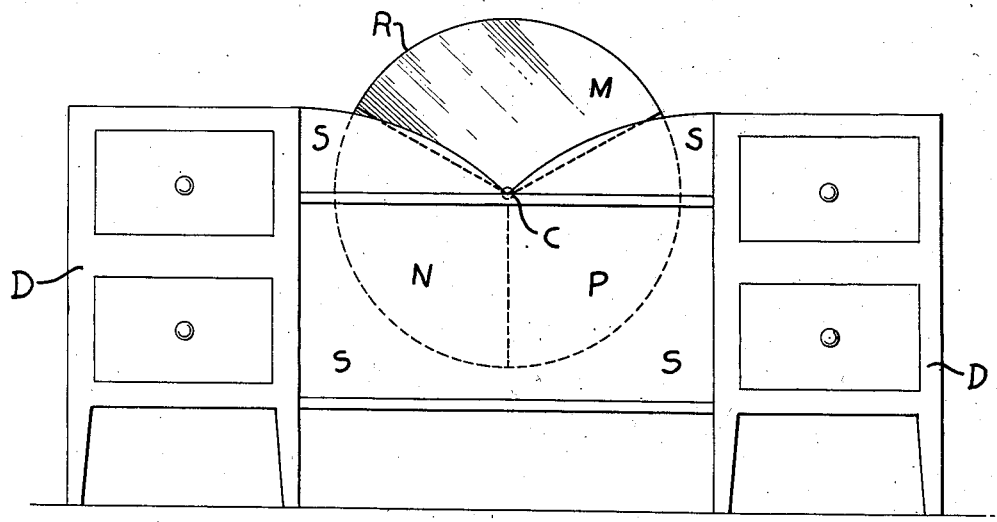
Fig. 3 depicts a front elevational view of a modified embodiment of my invention.

In the modified embodiment of the invention shown in Fig. 3, a dressing table D has a rotatable member R mounted on the rear thereof. The rotatable member has a central shaft C which is carried in a bearing to permit turning or rotation thereof.

Three mirrors are incorporated on the front face of the rotatable member. It is preferred to make the mirrors equal in size. In the embodiment illustrated, each mirror constitutes a sector which is about one third of the area of the entire circular member. One sector is a day mirror M, the second is a night mirror N, and the third is a plain mirror P. With this combination of mirrors, a woman can see her appearance in daylight or artificial light or in a plain mirror.

For the purpose of masking two of the mirrors and only permitting exposure of one mirror, a shield S is provided to co-operate with the rotatable member. This shield is secured to the dressing table and extends above the top thereof forming an obtuse angle. It is to be observed that only one sector is exposed in the position illustrated. By turning the rotatable member, any desired mirror can be exposed and the woman can determine her appearance in daylight, artificial light, etc. and can modify her make up in accordance with her desires.

Although the present invention has been described in conjunction with certain preferred embodiments, it is to be understood that variations and modifications may be resorted to as those skilled in the art will readily understand.

I claim:

1. A dressing table comprising a table, a bearing mounted on the rear of said table, a substantially horizontal shaft supported by said bearing, a rotatable member having its center connected to said shaft and adapted to be rotated in a substantially vertical plane, a plurality of mirrors carried by one side of said member and constituting a unit, said mirrors having different light reflecting properties, and a substantially vertical stationary shield secured to said table in front of said unit, said shield being so shaped and so positioned as to selectively expose one of said mirrors to the view of a person seated in front of said table and to cooperate with said table to obstruct the view of the other mirrors.

2. A dressing table comprising a table, a bearing mounted on the rear of said table, a substantially horizontal shaft supported by said bearing, a circular rotatable member having its center connected to said shaft and adapted to be rotated in a substantially vertical plane, a plurality of mirrors including a day mirror and a night mirror carried by one side of said member and constituting a unit, and a substantially vertical and stationary shield located in front of said unit and attached to said table, said shield being so shaped and so positioned as to cover certain of said mirrors from and expose the other mirrors to the view of a person seated in front of said table.

3. A dressing table comprising a table, a bearing mounted on the rear of said table, a substantially horizontal shaft supported by said bearing, a rotatable member having its center connected to said shaft and adapted to be rotated in a substantially vertical plane, a semi-circular day mirror and a semi-circular night mirror carried by one side of said member and constituting a unit, and a substantially vertical and stationary shield located in front of said unit and attached to said table, said shield being so shaped and so positioned as to cover one of said mirrors from and expose the other mirror to the view of a person seated in front of said table.

JOHN P. KANE.